United States Patent Office 3,408,890
Patented Nov. 5, 1968

3,408,890
SEPARABLE FASTENER ASSEMBLY
Harry L. Bochman, Jr., Seal Beach, Calif., assignor to Hi-Shear Corporation, Torrance, Calif., a corporation of California
Filed Jan. 27, 1967, Ser. No. 612,217
16 Claims. (Cl. 85—1)

ABSTRACT OF THE DISCLOSURE

This invention relates to separable fastener assemblies. According to this invention, a body is provided having a cylinder and a piston slidably mounted therein. Explosive means is in fluid communication with the cylinder and is adapted to discharge gas under pressure against the piston to move the piston axially in the cylinder. A separation bolt holds the joined assemblies together and to the body. A holder holds a portion of the separation bolt within the body. The piston has a cavity, and the holder is slidably mounted within that cavity. A non-compressible pliable medium is contained within the cylinder between the piston and the holder so that when the piston is moved by the force of the explosion, a surface on the piston displaces the fluid, forcing it against a surface of the holder. The holder thereby exerts an axial tension force on the separation bolt until the bolt breaks in tension under a predetermined force.

---

This invention relates to a separable fastener assembly.

There are numerous applications where assemblies are fastened together in such a manner that they can be separated by a signal. Conventional techniques for carrying out this separation include explosive bolts, guillotine devices and the like, wherein a high-strength part of the fastener is fractured to affect the separation. Such techniques involve the risk that separation might not occur, because the fastened assemblies might produce a lateral force on the fastener, tending to increase the friction force on the bolt or guillotine device, which friction force may prevent separation of the assemblies. Since the explosive charge must be large enough to assure proper fracture and extrusion, these techniques further involve the risk of damaging neighboring structure and the assemblies.

It is an object of this invention to provide apparatus for joining and accomplishing the separation of a pair of assemblies in which the separation can be effected by explosive means, but in which the explosive means need only overcome the tensile strength of a separation bolt, which tensile strength can be precisely determined. A minimal charge can be used for producing the tensile strength necessary to fracture the separation bolt, thereby reducing the risk of damaging neighboring structure. Furthermore, the location of fracture of the separation bolt may be located at any desired location within the joined assemblies, for example adjacent their junction, and remote from the explosion to assure proper separation of the assemblies.

An optional but desirable object of the present invention is to provide apparatus for joining and accomplishing the separation of a pair of assemblies utilizing a force-amplification means whereby low-pressure charges and low-shock charges may be used to obtain relatively large tensile forces.

According to the present invention a body is provided with a cylinder and a piston therein. Explosive means is in fluid communication with the cylinder and is adapted to discharge gas under pressure into the cylinder to move the piston axially in the cylinder. A separation bolt holds the joined assemblies to the body and a holder holds a portion of the separation bolt. The holder is slidably movable within a cavity in the piston so that when the piston in the cylinder is moved, a non-compressible pliable medium is moved against the holder, thereby exerting a predetermined axial tension force on the bolt thereby fracturing the bolt.

According to a preferred but optional feature of this invention, the working surface between the holder and the medium is greater than the working surface between the piston and the medium, whereby force from the gas pressure is amplified against the holder, thereby affording greater tensile force on the bolt.

Figure 1:
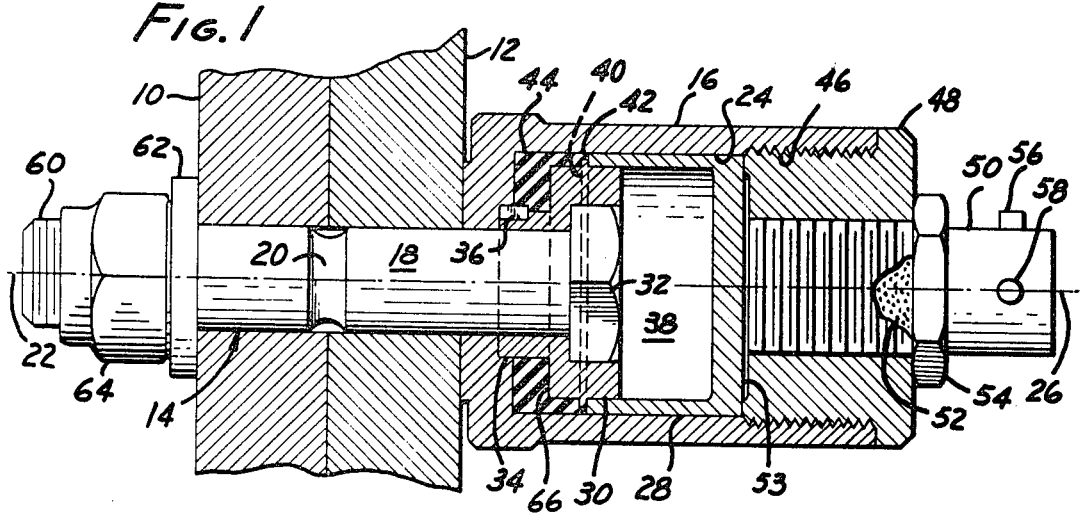
Figure 2:
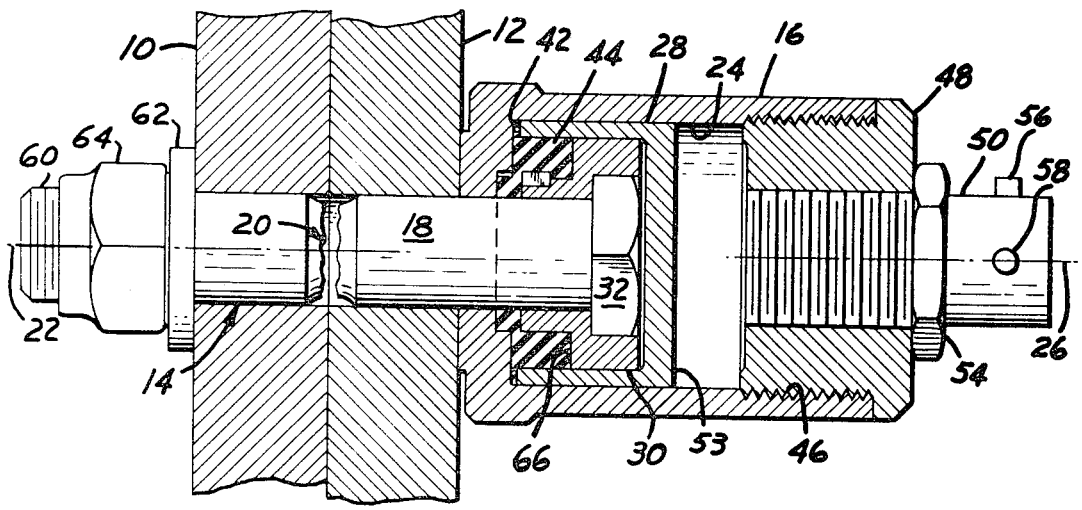

The above and other features of this invention will be fully understood from the following detailed description and the accompanying drawings, in which:

FIG. 1 is a side elevation, partly in cutaway cross-section showing the presently preferred embodiment of the invention in assembly-joining position; and FIG. 2 is a view as in FIG. 1, but with the device in a separation position.

In the drawings there is shown a separation bolt assembly wherein two assemblies 10 and 12 are joined. Bolt 14 having a shank 18 attaches the two assemblies to body 16. The shank of bolt 14 carries an annular recessed portion 20 forming a minimum planar section of least tensile strength where the bolt will first fracture in tension. Shank 18 and recessed portion 20 are preferably cylindrical about bolt axis 22.

Body 16 encloses a cylinder 24 which has an axis 26. Slidably mounted within cylinder 24 is a cup-shaped piston 28 for movement along axis 26. Bolt 14 carries a head 32 which is preferably press-fit into holder 30. Holder 30 conforms to and embraces the non-circular cross-section of head 32, which may, for example, be hexagonal, so as to prevent relative rotational movement between them, and carries a cylindrical portion 34 slidably mounted in body 16 for movement along axis 26. The holder is keyed to the body by key 36 to prevent relative rotational movement between the holder and the body so that the device can be tightened down. The holder is slidably mounted within cavity 38 of piston 28 for axial movement therein. An annular shear flange in the nature of lock ring 40 on holder 30 abuts surface 42 of piston 28 to hold the holder and the piston in relative position before fracturing of the separable bolt.

A non-compressible pliable medium 44 is confined within cylinder 24 between the cylindrical wall of the cylinder, the end portion of the cylinder, the outer portion of holder 30 and end surface 42 of piston 28. The confining non-compressible pliable medium 44 may be any suitable non-compressible, deformable material. For example, silicon rubber, available from the General Electric Company, has been found to be satisfactory for this purpose. A substance of this type has been found satisfactory because it is non-evaporable, will not leak past holder 30, piston 28 or out of cylinder 16 and is not free-flowing, so that its shape will be retained during the assembly of the device.

Working surface 66 of the holder is preferably larger than working surface 42 of the piston so that force exerted on piston 28 by the expanding gas from the charge 52 is amplified to the holder, and thereby to the bolt. It can be shown that this amplification is proportional to the ratio of the area of surface 66 to the area of surface 42. Thus, a minimal charge can be used for producing the tensile force necessary to fracture the bolt, thereby reducing the risk of damaging the neighboring structure.

Body 16 carriers a threaded portion 46 for receiving plug 48. Plug 48 carries internal threads for receiving ordnance device 50. Ordnance device 50, which preferably contains an explosive charge 52, is threaded into plug 48 and is in fluid communication with cylinder 24 and surface 53 of piston 28. A suitable nut 54 holds ordnance device 50 in position within plug 48. Terminals 56 and 58 are provided on ordnance device 50 for applying an electrical signal to explosive charge 52 to explode said charge.

In operation, head 32 of the separation bolt is placed in holder 30, and shank 18 of the bolt is passed through assemblies 10 and 12 so that housing 16 is brought into abutment against assembly 12. Bolt 14 carries a threaded portion 60 which receives a suitable washer 62 and lock nut 64. Washer 62 abuts assembly 10 so as to secure the assemblies together and to housing 16. When in the position illustrated in FIG. 1, axes 22 and 26 of the separation bolt and cylinder are aligned and the device is ready for separation.

An electrical signal is applied to terminals 56 and 58 to explode charge 52 of the ordnance device. When the ordnance device is fired, gas pressure from the explosion enters the cylinder and thereby drives piston 28 to the left (as illustrated in FIG. 2) causing the piston to shear off or deflect lock ring 40 on holder 30, and thereafter to exert pressure on medium 44. The non-compressible fluid presses against annular face 66 of the holder. Since the area of face 66 of the holder is preferably larger than the area of surface 42 of the piston, a substantial force amplification can be obtained and the force against face 66 can be made larger than the force on the piston, thus allowing use of low pressure charges and low shock charges to obtain relatively large tensile forces on the bolt. This force tends to move holder 30 to the right (as illustrated in the drawings) thereby exerting tension on the bolt until the bolt breaks at its weakest point.

Recessed portion 20 in shank 18 of separation bolt provides the weakest point in the shank of the bolt, so that when the separation bolt breaks in tension it will break at the annular recess. Annular recess 20 may be located at any position along the shank of the bolt. For example, recess 20 may be located adjacent the junction of the joined assemblies to ensue proper separation.

Bolt 14 is a standard bolt available in the field, modified only by the provision of recess 20. The cross-sectional area of the recess formed in shank 18 of the separation bolt may be accurately sized to provide a separation at a precise, known tensile force. The dimensions of the recess may be precisely controlled to provide for precise fracture at design separation forces.

The present invention provides a separable fastener assembly utilizing a separation bolt of standard design which is readily available and replaceable in the field, modified only by a readily formed groove. This invention provides means for reliably joining the bodies together and to separating them by the application of minimal explosive forces which can be closely related to the strength of the separation bolt to be broken in tension.

This invention is not to be limited by the embodiments shown in the drawings and described in the description which are given by way of example and not of limitation, but only in accordance with the scope of the appended claims.

I claim:

1. Apparatus for joining and accomplishing the separation of a pair of assemblies, said apparatus comprising: a separation bolt having an axis; a head and an integral shank formed about said bolt axis; engagement means on said shank, the shank being adapted to pass through said assemblies so that the bolt joins the assemblies between the head and the engagement means and holds them against relative axial movement until fractured by sufficient axial tension force; a body; an internal cylinder in said body having an axis; a piston slidably mounted in fluid sealing fit in said cylinder for movement along said body axis; an internal cavity in said piston; holder means slidably mounted in said cavity for movement along said body axis and adapted to engage the head of said separation bolt; a non-compressible pliable medium within said cylinder; a first surface on one side of said piston contacting said non-compressible pliable medium and a second surface on said holder means contacting said non-compressible pliable medium, said first and second surfaces having generators which are non-parallel to said body axis; and gas discharge means in communication with the cylinder adapted to discharge gas under pressure against a surface on the side of said piston opposite said one side, whereby upon discharge of gas into said cylinder, said first surface exerts a force against said non-compressible pliable medium to thereby exert a force against said second surface to move said holder means and said portion of the separation bolt along said body axis in said cavity, the axial movement of said portion of the separation bolt providing sufficient axial tension force on said separation bolt to accomplish fracture of said separation bolt.

2. Apparatus according to claim 1 wherein the separation bolt includes an annular minimum section on said shank, said minimum section being of least tensile strength and forming a plane where the bolt will first fracture in tension.

3. Apparatus according to claim 1 further including key means for keying said holder to said body to prevent relative rotation between them.

4. Apparatus according to claim 1 further including lock means integral with said holder abutting said first surface on said piston, whereby upon discharge of gas under pressure into said cylinder, said first surface shears said lock means.

5. Apparatus according to claim 4 wherein said lock means is an annular lock ring.

6. Apparatus according to claim 1 wherein the area of said second surface is larger than the area of said first surface.

7. Apparatus according to claim 6 further including key means for keying said holder to said body to prevent relative rotation between them.

8. Apparatus according to claim 7 further including lock means intergral with said holder abutting said first surface on said piston, whereby upon discharge of gas under pressure into said cylinder, said first surface shears said lock means.

9. Apparatus according to claim 8 wherein the separation bolt includes an annular minimum section on said shank, said minimum section being of least tensile strength and forming a plane where the bolt will first fracture in tension.

10. A device for use with apparatus for joining and accomplishing the separation of a pair of assemblies, said apparatus having a separation bolt having an axis, a head and an integral shank formed about said bolt axis, engagement means on said shank, the shank being adapted to pass through said assemblies so that the bolt joins the assemblies between the head and the engagement means and holds them against relative axial movement until fractured by sufficient axial tension force, said device comprising: a body; an internal cylinder in said body having an axis; a piston slidably mounted in fluid sealing fit in said cylinder for moving along said body axis; an internal cavity in said piston; holder means slidably mounted in said cavity for movement along said body axis and adapted to engage the head of said separation bolt; a non-compressible pliable medium within said cylinder; a first surface on one side of said piston contacting said non-compressible pliable medium and a second surface on said holder means contacting said non-compressible pliable medium, said first and second surfaces having generators which are non-parallel to said body axis; and gas discharge means in communication with the cylinder adapted to discharge gas under pressure against a surface on the side of said piston opposite said one side, whereby upon discharge of gas into said cylinder, said first surface exerts a force against said non-compressible pliable medium to thereby exert a force against said second surface to move said holder means and said portion of the separation bolt along said body axis in said cavity, the axial movement of said portion of the separation bolt providing sufficient axial tension force on said separation bolt to accomplish fracture of said separation bolt.

11. A device according to claim 10 further including key means for keying said holder to said body to prevent relative rotation between them.

12. A device according to claim 10 further including lock means integral with said holder abutting said first surface on said piston, whereby upon discharge of gas under pressure into said cylinder, said first surface shears said lock means.

13. A device according to claim 12 wherein said lock means is an annular lock ring.

14. A device according to claim 10 wherein the area of said second surface is larger than the area of said first surface.

15. A device according to claim 14 further including key means for keying said holder to said body to prevent relative rotation between them.

16. A device according to claim 15 further including lock means integral with said holder abutting said first surface on said piston, whereby upon discharge of gas under pressure into said cylinder, said first surface shears said lock means.

References Cited
UNITED STATES PATENTS 3,277,766 10/1966 Burkdoll _____ 85—1
3,352,189 11/1967 Brown _____ 85—1

EDWARD C. ALLEN, *Primary Examiner.*